United States Patent [19]
Lipschutz

[11] Patent Number: 5,068,833
[45] Date of Patent: Nov. 26, 1991

[54] DYNAMIC CONTROL CIRCUIT FOR MULTICHANNEL SYSTEM

[75] Inventor: David Lipschutz, Lexington, Mass.

[73] Assignee: Hewlett-Packard Company, Palo Alto, Calif.

[21] Appl. No.: 508,219

[22] Filed: Apr. 11, 1990

[51] Int. Cl.[5] .................... G01S 15/00
[52] U.S. Cl. .................... 367/98; 367/900; 367/135
[58] Field of Search .................... 367/98, 900, 138, 135; 73/642; 128/660.01, 661.01; 342/91, 92

[56] References Cited

U.S. PATENT DOCUMENTS 4,464,738 8/1984 Czajkowski .................... 367/900

*Primary Examiner*—Daniel T. Pihulic
*Attorney, Agent, or Firm*—Frank R. Perillo

[57] ABSTRACT

This invention provides an improved circuit for dynamically controlling a predetermined characteristic of each input channel of a system having a plurality of input channels to achieve a desired characteristic profile with predetermined time variances in channel aperture size and/or focal point depth. More particularly, the invention dynamically controls the gain of each input channel to maintain a desired apodization profile. A plurality of basic time varying functions (basis functions) are generated, such functions being, for example, a constant, a ramp, a parabola an exponential or the like, and at least selected ones of the basis functions are combined by appropriately weighting the functions and adding the weighted functions to obtain a desired control signal. The control signal which has the desired dynamic gain characteristic for the given channel is then applied to control a gain-controllable amplifier for such channel. The number of combining elements may be reduced by providing such combining elements for only a selected number of spaced channels and by linearly interpolating the signals obtained from such combining elements for each pair of spaced channels to obtain control signals to control gain for channels between each pair of spaced channels. System gain may also be controled by a signal generated by combining at least selected ones of the basis functions through weighting and adding.

19 Claims, 3 Drawing Sheets

DYNAMIC CONTROL CIRCUIT FOR MULTICHANNEL SYSTEM

FIELD OF THE INVENTION

This invention relates to systems receiving information on a plurality of channels and more particularly to a circuit for dynamically controlling a selected characteristic of each channel, for example, the gain of each input channel to maintain a desired apodization profile, with predetermined time variances in channel focal point or aperture size.

BACKGROUND OF THE INVENTION

There are a number of systems where information is received by appropriate sensors over a number of channels. Examples of such systems include radar, sonar, and phased array ultrasonic scanners used primarily for medical applications. While the teachings of this invention may find use with any system where information is being received over multiple channels, for purposes of illustration, the following discussion will be primarily with respect to a phased array ultrasonic scanner.

Such scanners may operate with a uniform fixed gain for all receive channels in the array. However, a receiver gain profile that smoothly decreases toward either end of the receiver array will achieve much improved side-lobe performance, although with some widening of the main lobe. This smooth tapering of gain is referred to as apodization, and the shape or characteristic of the tapering will be referred to as the apodization function or profile. There are a number of commonly used apodization functions which are well known from digital signal processing, these functions including the "Hamming function", the "Hanning function", the "Bartlett function" and the "Blackman function". Each of these gives a somewhat different tradeoff between main-lobe width and side lobe level. For purposes of illustration, the following discussion will be with respect to the Hamming function.

It may be desirable in some applications that the receive aperture, or in other words the number of available channels which are being utilized, be held constant. However, for applications such as ultrasonic scanning, where the depth of the scan increases uniformly with time, it is often desirable to maintain a constant f number (distance to the focal point/aperture size) rather than a constant aperture size. For example, for an assumed f number of f2, the aperture size would be maintained at one-half the distance to the focal point. However, since for a phased array ultrasonic scanner, the depth to the focal point increases linearly, constant f operation requires that the size of the receive aperture also be expanded linearly with time. Thus, a constant f receiver might start with only the center element or channel being used at depth 0, with the number of channels used increasing linearly until the depth reaches two times the array size (for an f number of f2) At this time, operation would still be at f2. For deeper depths, the system would return to constant aperture operation. More generally, it might be desirable to have the flexibility to start a scan with a selected aperture, to start constant f operations at a selected point in the scan, and to terminate constant f operations and return to constant aperture at a second, later point in the operation.

Dynamic aperture receiving is made more complicated by the fact that it may be desired to maintain the apodization function intact as the aperture expands. In other words, at every instant in time, the aperture gain on each channel should provide the desired apodization function stretched or compressed to fit the required aperture size at that instant. The aperture gain for channels outside the desired aperture size or window at a given instant should be, as nearly as possible, zero.

To achieve the above objective, each receiver channel needs to be controlled in gain as a function of time. Further, the time history of the gain or gain profile is different for each channel (except, due to symmetry about the center, channels equidistant from the center have the same gain).

Thus, to achieve dynamic apodized receive apertures, a controllable gain amplifier must be provided for each channel, with a means being provided for generating a different, time dependent, control signal for each of the controlled gain amplifiers. The gain desired for each channel is a function of two variables, the aperture position (x) of the channel and time (t) (which is directly related to the depth of scan). The exact function depends on the apodization function utilized. By holding x constant and varying only t for each element or channel in turn, it is possible to obtain the N separate gain control functions of time required to control the N different channels of the system. If the controlled gain amplifiers do not have a linear characteristic, the time functions can be predistorted to compensate for this nonlinearity.

While a computer with, for example, a table look-up ROM or RAM could be utilized to generate the required N time functions, or other similar digital techniques could be utilized to perform this function, such an implementation can be relative large, complex and expensive. It may also be relatively slow in generating the large number of gain control values needed, for example, for a 128 channel system at each given instant, where scanning is being performed rapidly.

Similar considerations may also apply for other values which vary with focal point or depth of scan in a given system, such as frequency, phase or the reduced system gain which arises from the smaller number of channels in a reduced size aperture.

A need, therefore, exists for a relatively simple, compact, inexpensive way to generate dynamic control signals in a multichannel signal receiving system, and in particular, to generate the dynamic gain control signals required to control the gain controlled amplifiers for each channel in such a multichannel system.

SUMMARY OF THE INVENTION

In accordance with the above, this invention provides an improved circuit for dynamically controlling the gain of each input channel of a system having a plurality of input channels to maintain a desired apodization profile with predetermined time variances in channel aperture size, such changes being introduced to maintain a substantially uniform f number with substantially linear time varying changes in the focal point or depth of scan. The circuit includes a means for controlling the gain of each channel. A plurality of basic time varying functions are generated, such functions being, for example, a constant, a ramp, a parabola, an exponential or the like. These functions serve as "basis functions" in the system, selected ones of these basis functions being combined by appropriately weighting each selected function and adding the weighted functions to obtain a signal having the dynamic gain characteristic for a given channel required for the desired apodization profile. The appropriate signal is then applied to control the gain control means for each channel. For the preferred embodiment, the apodization profile is a Hamming function, and the combining is accomplished by providing, for at least selected ones of the channels, a predetermined resistor network through which selected ones of the basis functions are passed and by summing the outputs from the resistor network. The selected functions and the resistor network for a given channel are preferably determined by using a curve-fitting program to approximate the dynamic gain control signal required at the given channel to achieve the desired apodization profile. The gain control means are preferably controllable gain amplifiers having nonlinear characteristics. Distortion caused by the nonlinear characteristics may be an additional input to the curve fitting programs so that the selected functions and resistor network also compensate for such nonlinearity. The curve-fitting program may also cause operation of the amplifiers at an end region with a flat characteristic during the significant delays which may occur in the apodized gain characteristic for some channels.

The rate of the predetermined time variance in aperture size may vary with application and the circuit may include a means for scaling the time variance of the basis functions to correspond with that of the aperture. The time variance in aperture size is preferably linear. The number of combining means may be reduced by providing combining means for only a selected number of spaced channels and by linearly interpolating the signals obtained from the combining means for each pair of spaced channels to obtain control signals for the gain control means for channels between each pair of spaced channels. Finally, the circuit may include a means for controlling the system gain to maintain this gain generally constant regardless of the number of channels utilized in the aperture, the system gain normally dropping off as the number of channels is reduced. This system gain may also be controlled by a signal generated by linearly combining at least selected ones of the basis functions through weighting and adding.

More generally, the circuit may be utilized to maintain a desired profile for any channel characteristic in a phased array ultrasonic scanning system which varies with time as a result of varations with time of aperture size or focal depth.

The foregoing other objects, features and advantages of the invention will be apparent from the following more particular description of a preferred embodiment of the invention as illustrated in the accompanying drawings.

IN THE DRAWINGS

DETAILED DESCRIPTION

Figure 1:
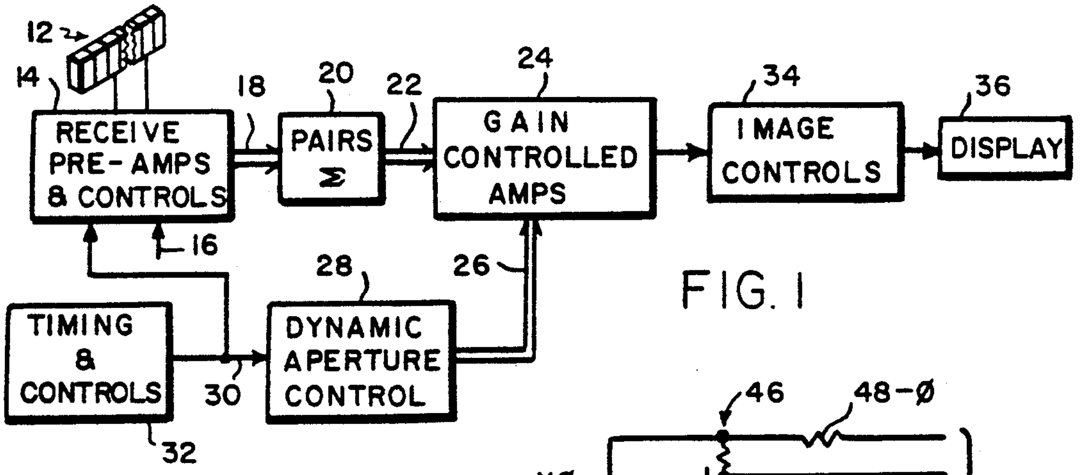
FIG. 1 is a block diagram of a phased array ultrasonic scanning system in which the teachings of this invention are utilized.

FIG. 1 illustrates a phased-array ultrasonic scanning system in which the teachings of this invention may be utilized. Referring to this Figure, the system includes a phased array 12 of ultrasonic transducers of a type generally used for medical imaging. A typical transducer array 12 might contain 64 or 128 such transducers. The transducers transmit an ultrasonic signal and also receive the reflected ultrasonic signal from the portion of the body being imaged. While all 128 of the transducers may be utilized for imaging, typically a subset of such transducers are used for imaging at any instant in time. Such transducer subset will be referred to as the transducer/channel aperture or window.

Signals received by transducers 12 are passed through appropriate preamplification and control circuits 14 which are standard in the industry. Circuits 14 may, for example, include, in addition to preamplifiers, various gain controlled amplifiers and controls such as mixers. For purposes which will be discussed in greater detail later, an input 16 is provided to the circuits 14, and in particular to gain controlled amplifiers contained therein.

The outputs from circuits 14 on lines 18 are applied to pairs summing circuits 20, which group together the outputs from adjacent pairs of transducers 12 for processing purposes so that, where there are 128 lines into circuit 20, there are only 64 lines out of the circuit. The outputs on lines 22 from circuits 20 are applied as the signal inputs to gain controlled amplifiers 24. Gain controlled amplifiers 24 are utilized to control the gain on each output channel pair to achieve a desired apodization characteristic.

Figure 2:
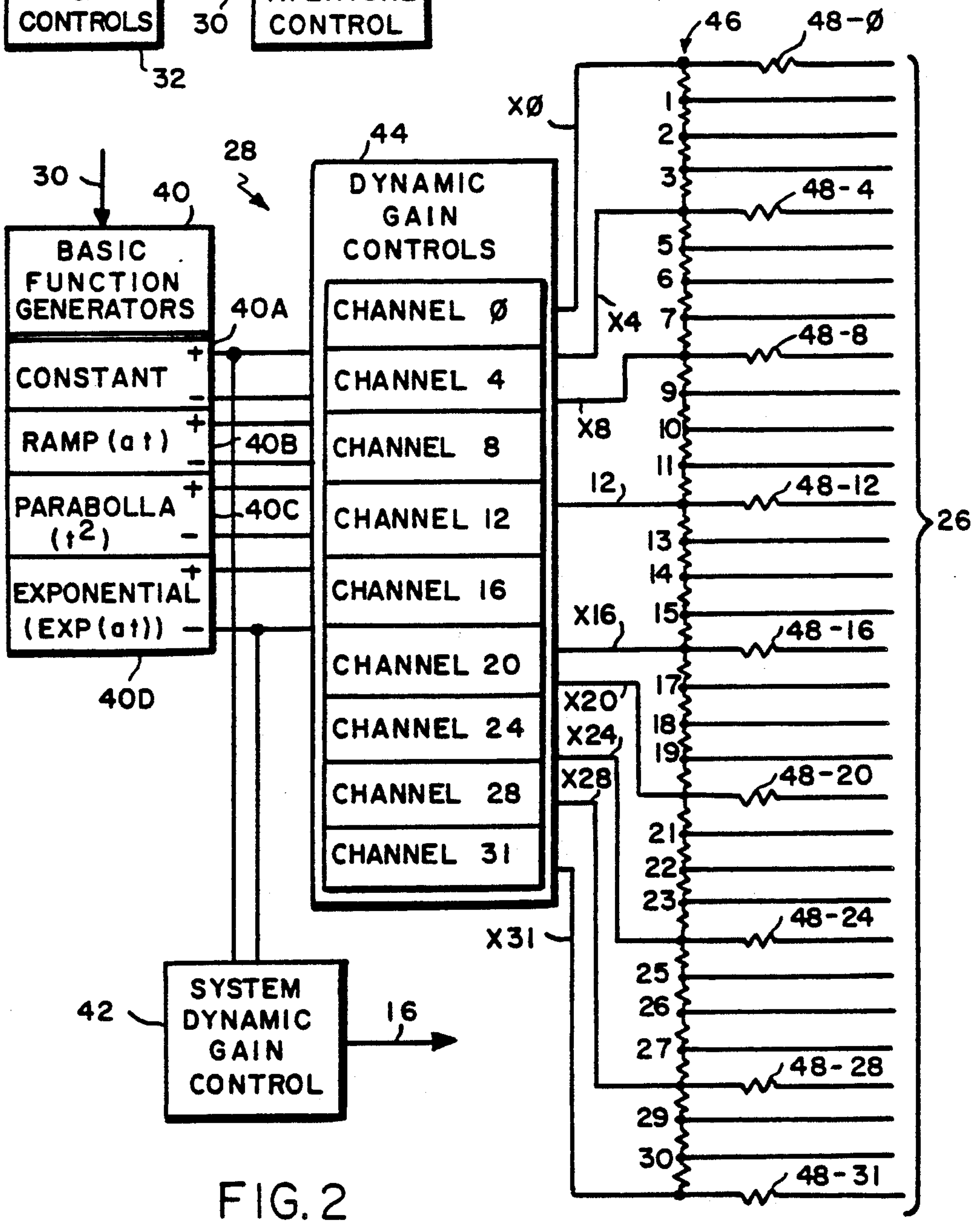
FIG. 2 is a schematic block diagram of a dynamic aperture control circuit for use in the embodiment of the invention shown in FIG. 1.

The control inputs to amplifiers 24 are obtained over thirty-two lines 26 from dynamic aperture control circuit 28. This circuit, which is shown in FIG. 2 and is described in greater detail hereinafter, provides a dynamic gain control signal for each channel such that the apodization profile for the channels conforms to the desired apodization profile at each instant in time. Synchronization between dynamic aperture control circuit 28 and the remainder of the system is assured by signals on lines 30 from timing and control circuit 32. Timing control circuit 32 may be either a hardware or software circuit which controls the operation of the system.

The outputs from gain controlled amplifiers 24 are applied through suitable image control circuitry, which may include, for an ultrasonic imaging system, various delay lines, filters, buffers, and the like, to a display device 36. Display device 36 which may, for example, be a cathode-ray tube, displays an image of the portion of the body being scanned by transducers 12.

Typically, when transducers 12 are scanning an area, they start by being focused at a point at or near the surface, and the focus point linearly increases with time. As previously indicated, in order to maintain a constant f number when doing such scans, it is necessary that the aperture (i.e., the number of transducers used in the scan) also linearly increase as the scan progresses. The circuitry shown in FIG. 2 is intended to maintain the desired apodization profile as the aperture widens.

Referring to FIG. 2, dynamic aperture control 28 includes a plurality of basic function generators 40. For purposes of illustration, these generators are shown as a constant generator 40A, a ramp generator 40B, a parabola generator 40C and an exponential generator 40D. Each of these generators may generate a positive signal, (i.e., a signal which increases with time), a negative signal (i.e., a corresponding signal which decreases with time) or, as shown in FIG. 2, may generate both a positive and negative output. In the case of the constant, the output is either a positive offset or a negative offset. The functions shown in FIG. 2 are hereinafter referred to as "basis functions" and have been selected because of their ease of generation, the constant being a reference potential which is either used as is, enhanced or attenuated, and possibly inverted; the ramp being obtained by integrating a constant (a); the parabola being obtained by integrating a constant (b) times the ramp signal; and the exponential being obtained as an exponential of a constant times a time function (i.e. capacitor discharging through a resistor).

The outputs from the function generators 40 are applied to a system dynamic control circuit 42 and to dynamic gain controls 44. As will be described in greater detail in conjunction with FIG. 3, each dynamic gain control circuit, as well as the system gain control 42, accepts selected ones of the output from generators 40, weights these values with resistors and then combines the weighted values, preferably by summing, to obtain a signal having the dynamic gain characteristic for a given gain controlled amplifier.

The particular weighting resistance values and the basis functions outputted from circuit 40 which are utilized in producing each gain controlled amplifier control signal are determined using standard curve fitting techniques such as curve-fitting programs known in the art. An example of a curve-fitting program suitable for this application is the curve fitting routine of Numerical Methods Toolbox from Borland International, Scotts Valley, Calif. The information inputted to this program include the available functions from generators 40 and the desired curve or time function required for each gain control signal. The rate at which the output function need be generated is not a factor to be considered by the curve-fitting program since this is taken care of by the signal 30 applied to control the function generators 40. Thus, the rate at which the outputs from the function generators vary is synchronized with the rate at which the focal point depth, and thus the aperture width is increased.

The system dynamic gain control 42 is utilized to compensate for the reduced gain caused by a small window or aperture, a lesser number of sensors and channels being used in this situation than with a wider aperture. While the output from circuit 42 may be applied to control the gain controlled amplifiers 24, it has been found that the loss in gain resulting from reduced aperture size may be in the area of 20 db, and any attempt to add this much gain to the limited number of gain controlled amplifiers 24 being utilized with a narrow aperture might cause these amplifiers to saturate. It is, therefore, generally preferable to apply the output line 16 from system gain control 42 to controlled gain amplifiers in the circuits 14. This is shown in FIGS. 1 and 2.

As was indicated in the introductory portion, one of the objects of this invention is to provide a significantly simplified circuit. One way in which this may be accomplished is to reduce the number of dynamic gain control circuits 44, providing such circuits, for example, for every fourth channel, and obtaining the dynamic gain control signals for channels intermediate these channels through interpolation. Thus, circuits 44 are provided only for channels 0, 4, 8, 12, 16, 20, 24, 28 and 31. The outputs from these circuits are connected to appropriate nodes on a resistance chain interpolator 46. Resistors 48-1, 48-4, 48-8, 48-12, 48-16, 48-20, 48-24, 48-28 and 48-31 are provided in series with the corresponding output lines 26 from circuit 44 for impedance matching purposes. The output lines from interpolator 46 are the output lines 26 from dynamic aperture control 28 to gain controlled amplifiers 24 (FIG. 1).

Since, as previously indicated, the gain control characteristics are symmetrical about the center, each of the output lines 26 is applied to two gain control amplifiers 24, one corresponding to a channel to the left of the center of the array and the other for the corresponding channel to the right of the array center. Similarly, each gain controlled amplifier is utilized to control two adjacent channels. Thus, for a 128 transducer array 12, the gain controlled amplifier controlled by the signal on the 0 line of the output lines 26 would be utilized to control gain for channel 0 and the adjacent channel 0' (not shown). Assuming channels 0 and 0' are to the right of the center of the array, this signal would also be applied to control the amplifier for the corresponding two channels to the left of array center. Each remaining output line 26 would similarly be applied to control gain for two gain controlled amplifiers, and thus for four channels of the array.

Figure 3:
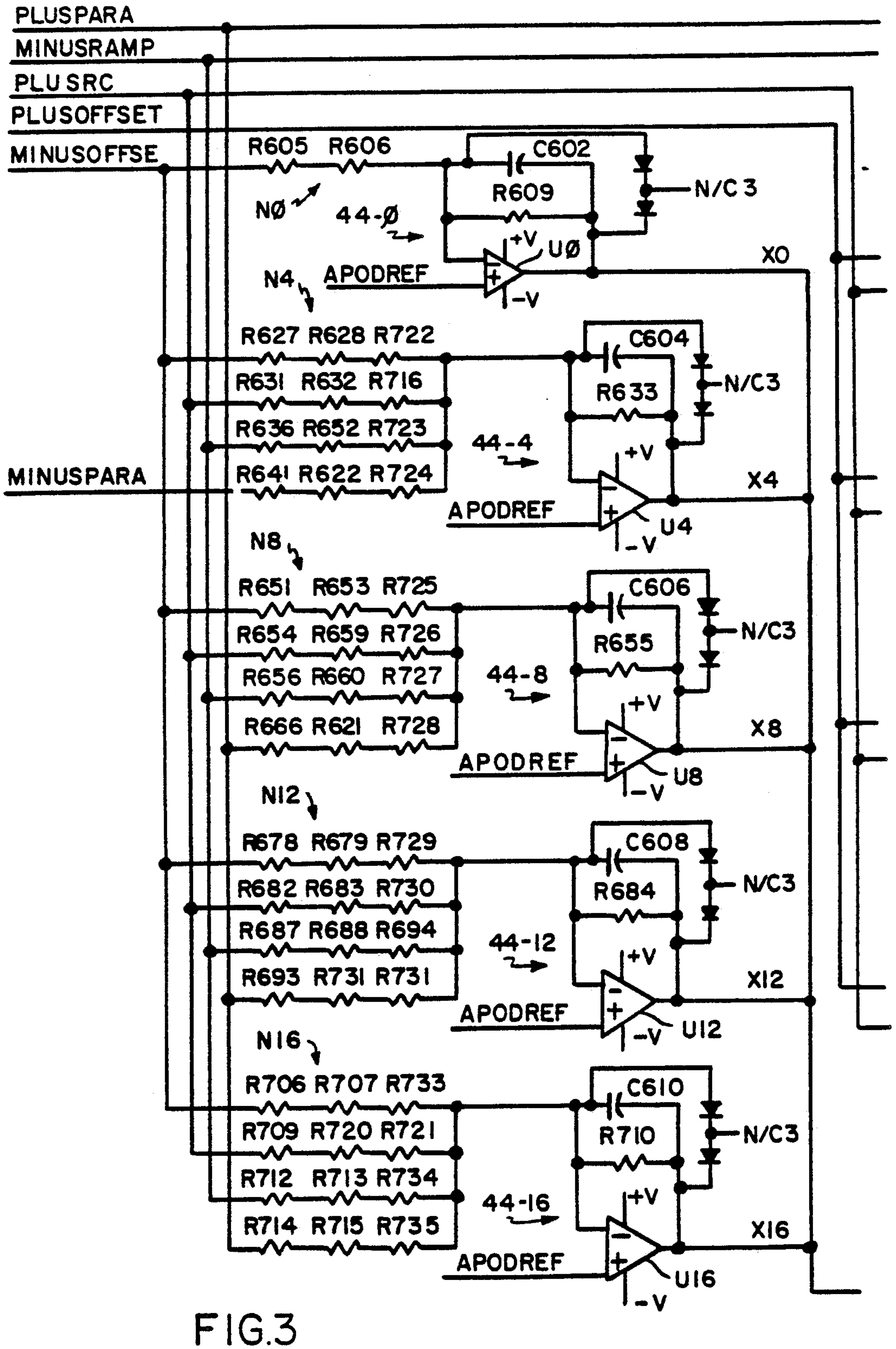
FIG. 3 is a schematic circuit diagram of a number of dynamic gain control circuits suitable for use as a dynamic gain control circuit in FIG. 2.

Referring now to FIG. 3, five exemplary dynamic gain control circuits 44 are shown for a preferred embodiment of the invention. These circuits are circuits 44-0, 44-4, 44-8, 44-12, and 44-16, which circuits are utilized to generate the output signals on lines X0, X4, X8, X12 and X16, respectively. Similar circuits are utilized to generate output signals on lines X20, X24, X28 and X31.

Each gain control circuit 44 consists of an operational amplifier, U0, U4, U8, U12 and U16, respectively, having a reference voltage applied to its pin 3 positive input terminal and a negative clamping voltage applied to its pin 4 V− input. A positive clamping voltage is applied to its pin 7 V+ input. The inputs to the pin 2 minus input of each amplifier are the op amp feedback signal and an input from a weighting resistance network N. Resistance network N1 has only a single leg and a single input which is a minus offset voltage, in other words a constant. As will be seen later, this is because the characteristic for the 0 or center channel is constant gain. Each of the remaining resistance networks N has four legs, one of which receives the constant minus offset potential, and the others of which receive either a plus or minus parabola, a minus ramp, or a plus exponential. As previously indicated, the particular basis function selected and the weighting resistors for each of the resistance networks are selected utilizing a standard curve-fitting program such as that previously indicated to achieve the desired gain profile for the particular channel.

Figure 4:
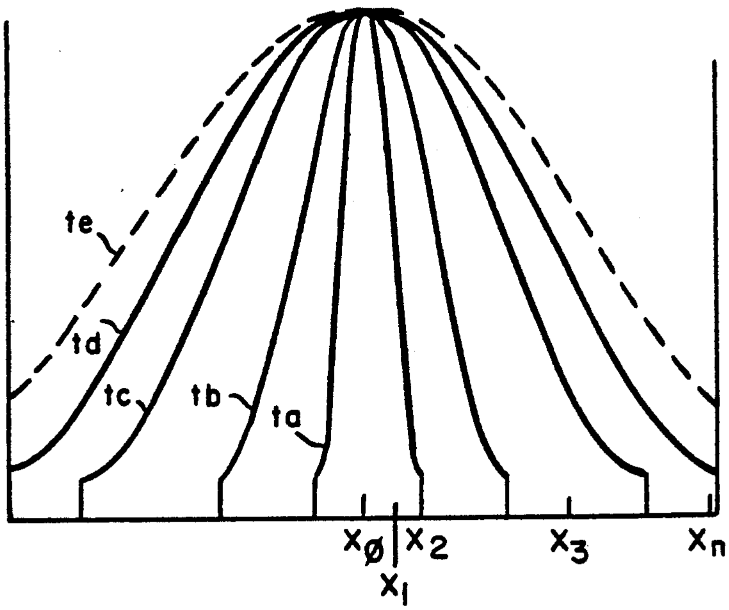
FIG. 4 is a diagram illustrating the apodized gain characteristic for a system of the type shown in FIG. 1 at various points in time as the depth of scan increases.

FIG. 4 shows the gain profile for the channels of the array 12, assuming that the apodization function is a Hamming function. The curves shown are at four different times in a scanning cycle, time ta being, for example, at or near the beginning of the cycle when the scan is focused at a shallow depth and the aperture window is thus relatively narrow, encompassing only the center few channels. At a later time, time tb, the focus is deeper and thus the apodized gain characteristic is wider. Time tc illustrates the gain characteristic at a still greater depth when the aperture is nearly equal to the full width of the array 12, while the curve td may be at the maximum depth when the aperture encompasses the full array. However, this is not a limitation on the invention, and it is possible that the scan may continue for depths beyond td. When this occurs, the width of the aperture remains constant with increasing depth, but the apodization profile becomes flatter, and an example of such a profile being the profile te shown in dotted lines in FIG. 4. It is also possible, utilizing the teachings of this invention, for the aperture to have any desired initial width, for changes in aperture width to begin at any time (depth) in the scan, and for changing aperture width and/or apodization to end at any time in the scan. Any of the above will result in a unique apodized gain profile.

Figure 5:
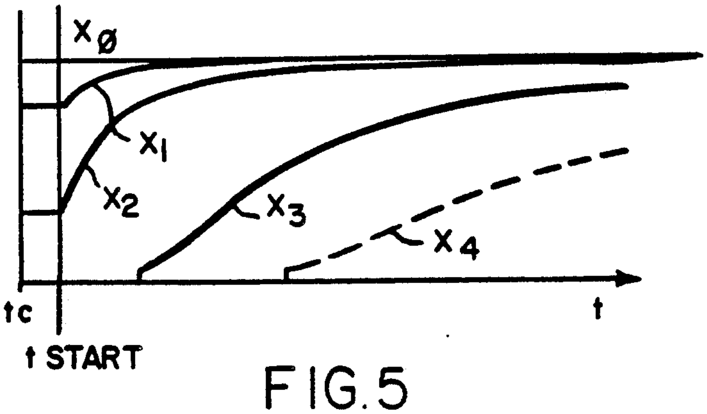
FIG. 5 is a diagram illustrating the dynamic gain characteristics for selected outputs from FIG. 2.

To achieve the gain profile with time shown in FIG. 4, it is necessary that each channel xo-xn have a gain characteristic which varies in time so that the gain on the channel at each instant in time is that required to achieve the apodized gain profile for that point in time shown in FIG. 4. Thus, since channel xo is always being utilized at full gain for all times, the gain characteristic for this channel, as shown in FIG. 5, is a straight line at maximum gain. This is also illustrated in FIG. 3 with the channel 44-0 which has only a single constant value input. While the channel x1 is on for all of the time periods, this channel is not at its maximum gain for the early time periods, but achieves maximum gain relatively early in the cycle. This curve is illustrated by the line x1 in FIG. 5. Similarly, channel x2 has substantially zero gain for the initial time period, but has a finite gain for all other time periods, approaching maximum gain for the later time periods. This is illustrated by the curve x2 in FIG. 5. Finally, channel x3 has zero gain for a substantial number of time periods and thus becomes active only after a significant time delay. This is illustrated by the curve x3 in FIG. 5. Channel xn might be at constant zero if td is the time at which maximum depth of scan occurs, but would have a characteristic such as xn shown in FIG. 5 if the scan continues to a time te (FIG. 4).

Figure 6:
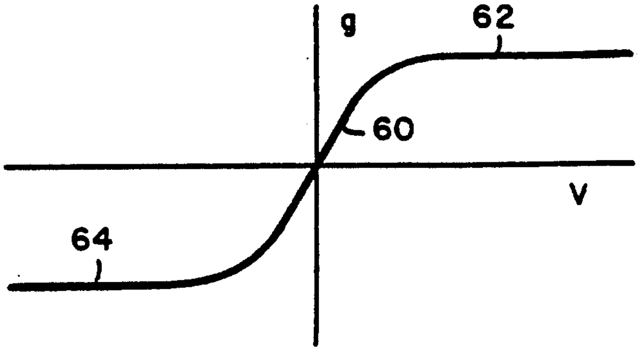
FIG. 6 is a diagram illustrating the controlled gain characteristic for a controlled gain amplifier of the type used in FIG. 1.

FIG. 6 illustrates the gain characteristic for a single one of the gain controlled amplifiers 24. Each of these amplifiers has a linear region 60 where the gain increases substantially linearly with increase in the control voltage applied to the amplifier over the appropriate one of the lines 26. Each amplifier 24 also has a high voltage, nonlinear region 62 and a low voltage, nonlinear region 64 where the gain remains substantially constant regardless of increases or decreases, respectively, in the control voltage. Advantage will be taken of this nonlinearity in the operation to be now described.

In operation, the basis functions 40 to be utilized in the system are selected as is the desired apodization function. This information is then fed into a suitable computer running a selected curve-fitting program such as the ones previously mentioned. Assume, for example, that the apodization function utilized is a Hamming function, then the value of the gain at a point x for a window width w is:

$$\begin{aligned} h(x,w) &= .54 + .46 \cos(\text{pi} * x/w(t) \quad \text{for } |x| <= w \\ &= 0 \quad \text{for } |x| > w \end{aligned}$$

By holding x constant and varying w(t), the gain characteristics shown in FIG. 5 can be obtained for each channel x. These gain characteristics can then be utilized by the curve-fitting program to determine the required ones of the basis functions to be utilized in generating the desired time-varying gain control signal for the channel x and the weighting resistance network N used with such functions. For the preferred embodiment, it is assumed that all changes in focal point distance, and thus in aperture width, are linear with time. However, this is not a limitation on the invention and curves and weighting functions could be provided for generating characteristics which do not vary linearly with time. Depending on the variations with time, additional or different basis functions may be required. Further, to the extent it is necessary to compensate for nonlinearities in the gain controlled amplifiers 24, the characteristics of the gain controlled signals for the channels may be varied to compensate for such nonlinearities. Such nonlinearities may also be utilized to obtain the initial time delays such as those shown for the x3 and xn channels in FIG. 5. This is accomplished by operating the gain controlled amplifier 24 for the given channel in, for example, its region 64 during the delay period. The clamping inputs to the op amps of the circuits 44 may be utilized in achieving this objective.

The operations described to this point are performed off-line and are utilized in the design of each dynamic gain controlled circuit 44. Once these circuits are designed, the same circuits may be utilized so long as the same apodization function is being utilized and the focal point changes during scanning remain linear with time. If a change is desired in either of these characteristics, or in the basis functions being utilized, then new dynamic gain controls 44 will be required.

However, while the function being utilized remains constant, the rate at which the depth of focal point, and thus aperture width, increases can change without requiring a change in the dynamic gain controls. This is accomplished by varying the signal on line 30 from timing and control circuits 32 which, in turn, controls the rate of change for the various basic function generators 40. The rate of change of the basic function generators are thus synchronized to the timing for the scanning circuitry.

Once the dynamic gain control circuits 44 have been determined and installed, the basic function generators 40 have been determined and installed and the rate of change in those generators has been controlled by circuit 30, the circuit starts generating the required gain control outputs on lines 26 to gain controlled amplifiers 24 each time transducers 12 begin a scan cycle. System dynamic gain control 42 also generates an output on line 16 to gain control amplifiers in circuits 14 to control the system gain so that it remains substantially constant regardless of the number of channels being utilized.

A simple, compact, relatively inexpensive dynamic apodization circuit is thus provided. While for the preferred embodiment, this circuit has been illustrated in conjunction with a phased array ultrasonic scanning system, as has been previously indicated, the techniques of this invention could be utilized in any dynamically changing multichannel system such as radar or sonar arrays. The basis functions utilized and the basis function generators 40 could also be varied with application as could other details of the various circuits employed. Further, while for the preferred embodiment, the depth of focal point, and thus operative width, increased with time, the invention could also be utilized with these functions decreasing in value with time (i.e. starting a scan at maximum depth). Thus, while the invention has been particularly shown and described with reference to a preferred embodiment, the foregoing and other changes in form and detail may be made therein by one skilled in the art without departing from the spirit and scope of the invention:

What is claimed is:

1. A circuit for dynamically controlling the gain of each input channel of a system having a plurality of input channels to maintain a selected apodization profile with predetermined time-variances in channel aperture size, the circuit comprising:

means for controlling the gain for each channel;

means for generating a plurality of basis time-varying functions;

means for combining at least selected ones of said basis functions by appropriately weighting each selected function and adding the weighted functions to obtain a signal having the dynamic gain characteristic for a given channel required for the selected apodization profile; and means for applying the appropriate signal to control the gain control means for each channel.

2. A circuit as claimed in claim 1 wherein the selected apodization profile is a Hamming function.

3. A circuit as claimed in claim 1 wherein said basis time-varying functions include a constant, a ramp, a parabola and an expotential.

4. A circuit as claimed in claim 3 wherein said means for combining includes, for at least selected ones of said channels, a predetermined resistor network through which selected ones of said functions are passed, and means for summing the outputs from said resistor network.

5. A circuit as claimed in claim 4 wherein the selected functions and the resistor network for a given channel are determined by using curve-fitting techniques to approximate the dynamic gain control signal required at the given channel to achieve the selected apodization profile.

6. A circuit as claimed in claim 5 wherein the gain control means are controllable gain amplifiers having nonlinear characteristics, and wherein the distortions caused by said nonlinear characteristics is an additional input to said curve-fitting techniques.

7. A circuit as claimed in claim 6 wherein the apodized gain characteristic for some channels include a significant delay during which the gain is substantially zero, and wherein the curve-fitting program operates the amplifier in an end region with a flat characteristic during such delays.

8. A circuit as claimed in claim 1 wherein said system is a phased array ultrasonic scanning system, and wherein said aperture size varies to maintain a substantially constant f number for the system.

9. A circuit as claimed in claim 1 wherein the rate of said predetermined time variance in aperture size may vary; and including means for scaling the time variance of said basis functions to correspond with that of said aperture.

10. A circuit as claimed in claim 9 wherein the time variance in aperture size is linear.

11. A circuit as claimed in claim 1 wherein there are combining means for only a selected number of spaced channels; and including means for linearly interpolating the signals obtained from the combining means for each pair of spaced channels to obtain control signals for the gain control means for channels between said pair of spaced channels.

12. A circuit as claimed in claim 1 wherein the selected apodization profile results in one or more center channels being utilized when the aperture is small, with an increasing number of channels being utilized as the aperture widens, the overall system gain being proportional to the numbers of channels utilized; and including means for controlling the system gain to maintain this gain generally constant regardless of the number of channels utilized.

13. A circuit as claimed in claim 12 wherein said means for controlling includes means for combining at least selected ones of said basis functions by weighting each selected function and adding the weighted functions to obtain a system gain control signal which compensates for reduced channels to maintain substantially uniform system gain.

14. A circuit for dynamically controlling a selected characteristic of each input channel of a phased array ultrasonic scanning system having a plurality of input channels to maintain a selected profile for the characteristic with predetermined time variances in the depth of the focal point for such channels, the circuit comprising;

means for controlling the characteristic for each channel;

means for generating a plurality of basis time-varying functions;

means for combining at least selected ones of said basis functions by appropriately weighting each selected function and adding the weighted functions to obtain a signal having the dynamic characteristic for a given channel required for the selected characteristic profile; and means for applying the appropriate signal to control the characteristic for each channel.

15. A circuit as claimed in claim 14 wherein the aperture of channels utilized widens as the depth of the focal point increases, the overall system gain being proportional to the number of channels utilized; and wherein said means for controlling includes means for controlling the gains of the aperture channels to maintain the system gain generally constant regardless of the number of channels utilized in the aperture.

16. A circuit as claimed in claim 14 wherein there are combining means for only a selected number of spaced channels; and including means for linearly interpolating the signals obtained from the combining means for each pair of spaced channels to obtain control signals for the characteristic control means for channels between said pair of spaced channels.

17. A circuit as claimed in claim 14 wherein the rate of said predetermined time variance and the depth of focal point may vary; and including means for scaling the time variance of said basis functions to correspond with that of said focal point depth.

18. A circuit as claimed in claim 14 wherein said means for combining includes, for at least selected ones of said channels, a predetermined resistor network through which selected ones of said functions are passed, and means for summing the outputs from said resistor network.

19. A circuit as claimed in claim 18 wherein the selected functions and the resistor network for a given channel are determined by using a curve-fitting program to approximate the dynamic characteristic required at the given channel to achieve the selected characteristic profile.

* * * * *